United States Patent [19]

Iogansen et al.

[11] 4,126,799

[45] Nov. 21, 1978

[54] DEVICE FOR SECURING END CONNECTORS OF ELECTRIC MACHINE STATOR WINDING

[76] Inventors: Vadim I. Iogansen, ulitsa Gavanskaya, 34, kv. 167; Ibragim A. Kadi-Ogly, Tallinskoe shosse, 66, kv. 180; Jury V. Petrov, prospekt Kosmonavtov, 50, korpus 4, kv. 24; Izrail A. Ptakul, Pulkovskaya ulitsa, 17, kv. 158; Vladimir P. Chernyavsky, Pulkovskaya ulitsa, 17, kv. 185; Aron B. Shapiro, ulitsa Basseinaya, 53, kv. 71; Gennady V. Shkoda, Bukharestskaya ulitsa, 39, korpus 3, kv. 38, all of Leningrad, U.S.S.R.

[21] Appl. No.: 772,472

[22] Filed: Feb. 28, 1977

[51] Int. Cl.² ............................................. H02K 3/46
[52] U.S. Cl. ......................................... 310/260; 310/194
[58] Field of Search ............... 310/260, 270, 271, 194, 310/179; 336/197

[56] References Cited

U.S. PATENT DOCUMENTS

| Re. 28,478 | 7/1975 | Bahn | 310/270 |
| 3,344,296 | 9/1967 | Coggeshall | 310/260 |
| 3,344,297 | 9/1967 | Bishop | 310/260 |
| 3,348,085 | 10/1967 | Coggeshall | 310/260 |
| 3,975,655 | 8/1976 | Beermann | 310/260 |
| 3,991,334 | 11/1976 | Cooper | 310/260 |

FOREIGN PATENT DOCUMENTS

| 1,366,320 | 6/1964 | France | 310/260 |
| 402,146 | 5/1966 | Switzerland | 310/260 |

*Primary Examiner*—R. Skudy
*Attorney, Agent, or Firm*—Lackenbach, Lilling & Siegel

[57] ABSTRACT

A device for securing the end connectors of an electric machine stator winding, wherein the magnetic circuit stacks thereof are clamped axially by means of elements arranged on the end surfaces of the stator core, comprises two insulating conical rings, the end connectors of the winding being arranged between the conical surfaces of the rings. The outer conical ring is connected with the clamp board and is being adapted to move axially with respect to the clamp board. The inner conical ring is retained in an axial direction by means of axially arranged rods pivotally connected with the outer conical ring by means of supports. The suports are pivotally secured in the elements axially clamping the magnetic circuit stacks by means of radially arranged rods. The proposed structure provides for dependable securing of the end connectors of the winding, such that damage of insulation and loosening are avoided during the course of operation.

6 Claims, 2 Drawing Figures

DEVICE FOR SECURING END CONNECTORS OF ELECTRIC MACHINE STATOR WINDING

FIELD OF THE INVENTION

The present invention relates to high-power electric machines and, more specifically, to devices for securing the end connectors of stator windings of electric machines. The invention can be most advantageously used in high-power turbogenerators, synchronous compensators, and peak turbogenerators.

The end connectors of a turbogenerator stator winding operate under unfavorable conditions of marked variable electromagnetic forces, thermal strain, and difficulties in assembly arising from creepage and relaxation of strain in non-ferrous securing parts. Because of these factors, securing of the end connectors is complicated and the stability and dependability thereof are adversely affected.

End connectors are mainly deteriorated by variable electromagnetic forces acting upon the end-connector arcs. Vibration of end connectors results in damage to the soldered core joints, as well as in abrasion and battering of the insulation at the points of attachment and exit from the groove and in damage of the copper conductors due to fatigue. Vibration of end connectors can only be reduced by means of rigid external securing thereof.

DESCRIPTION OF THE PRIOR ART

Known in the art are two methods of securing end connectors of a stator winding: firstly, clamping of the end connectors between conical surfaces of two insulating rings and, secondly, sealing the end connectors with a polymerizing substance which secures the end connectors with the clamp board of the core or with the outer insulating ring. The second method makes it rather difficult to repair the winding.

Known in the art is a device for securing the stator end connectors according to the first method hereinbefore disclosed, wherein the inner insulating ring rests on the inner surface of the end connectors and is fixed axially by means of non-magnetic bolts screwed into the elements of securing the end portion of the stator core. This structure is disadvantageous because of:

(a) the rigid fixation of the inner insulating ring in an axial position relative to the stator core without taking into account the axial displacement of the grooved portion of the winding due to thermal expansion, said thermal expansion being caused by a temperature differential and a difference in the linear expansion coefficients of copper and steel, which can lead to loosened or overtight secure; and (b) the danger of the core securing parts being pulled out by ring-retaining bolts, and, secondly, the reduced compression of the active steel of the core toothed portion.

Also known in the art are stator winding end connectors secured between two insulated rings, wherein strips are used to secure said end connectors, said strips adjoining the conical surfaces of said end connectors along the inner surface (view taken from the boring side) between the winding layers and the outside. Said strips rest on the inner ring axially fixed thereto by keys. The end connectors are clamped by wedges placed between the outer insulating ring and the strips, adjoining the winding end connectors on the outside. All the strips are axially fixed by means of shoulders resting on the winding core insulation in the bent end connector portions. This structure is disadvantageous because of:

(a) too many insulating parts and links being used, which affects the fastening system because of the changes in dimensions and the mutual arrangement of parts inevitable in such operation; and (b) the possible damage to the insulation of the winding cores due to the strip shoulders.

SUMMARY OF THE INVENTION

It is an object of the present invention to provide a dependable device for securing end connectors of an electric machine stator winding, which eliminates the possibility of loosening when in use.

A further object of the invention is to provide a securing device for end connectors of the stator winding of an electric machine that will not break the winding insulation.

Still another object of the invention is to provide a securing device for end connectors of the stator winding of an electric machine that will not reduce the compression of the active steel of the core.

Yet another object of the invention is to provide a securing device for end connectors of the stator winding of an electric machine that will facilitate and simplify assembly.

Another object of the invention is to provide a securing device for end connectors of the stator winding of an electric machine that will permit compensation for the thermal elongation of the winding.

A further object of the invention is to provide a securing device for end connectors of the stator winding of an electric machine that will enable repair of the winding.

These and other objects are attained by a device for securing the end connectors of the stator winding of an electric machine, wherein the end surfaces of the core of said stator has elements compressing magnetic circuit stacks axially and including clamp boards and thrust pins. The device comprises two conical rings made of an insulating material, between the conical surfaces of which the winding end connectors are arranged. The outer conical ring is connected with the clamp board and adapted to move axially with respect thereto. The inner conical ring is axially retained by means of axial rods, which, in accordance with the invention, are pivotally connected with the outer conical ring by means of supports arranged at the exit of the winding from the grooved portion of the stator and hinged to the elements, which axially compress the magnetic circuit stacks, by means of radially disposed rods.

The proposed embodiment ensures highly rigid stator winding end connectors and minimum vibration. The end connectors are clamped between the two rigid insulating rings and adapted for limited axial movement, along with the insulating rings, with respect to the stator core clamp board. This movement is intended to compensate for the difference between the thermal expansion of the core and that of the grooved portion of the stator winding. Rigidity of connection with the clamp board in a radial direction is maintained by this device. Furthermore, the winding insulation integrity is not affected with the structure herein disclosed, as the elements clamping said insulating rings are not directly in contact with it. The compressed end portion of the core is unaffected too, as the component of the axial force clamping the insulating rings is applied neither to the clamp board nor to the core.

In accordance with an embodiment of the invention, the supports are hinged to the thrust pins by means of radially disposed rods.

The supports can also be attached to the clamp board by means of the radially disposed rods.

Preferably, springs can be mounted on the axial rods on the outer end surface side of the inner conical ring, the springs being intended to provide stable clamping of the inner conical ring to the end connectors of the winding, so that the clamping force would not be reduced in the case of elastic deformation or displacement of parts during operation of the electric machine.

BRIEF DESCRIPTION OF THE INVENTION

Other objects and advantages of the present invention will become apparent from the following detailed description thereof, taken in conjunction with the accompanying drawings, wherein:

FIG. 1 is a longitudinal sectional view showing a device for securing end connectors of a high-power turbogenerator stator winding, in accordance with the present invention; and FIG. 2 is a longitudinal, sectional view showing another embodiment of a device for securing end connectors of a high-power turbogenerator stator winding, in accordance with the present invention.

DETAILED DESCRIPTION OF THE INVENTION

Figure 1:
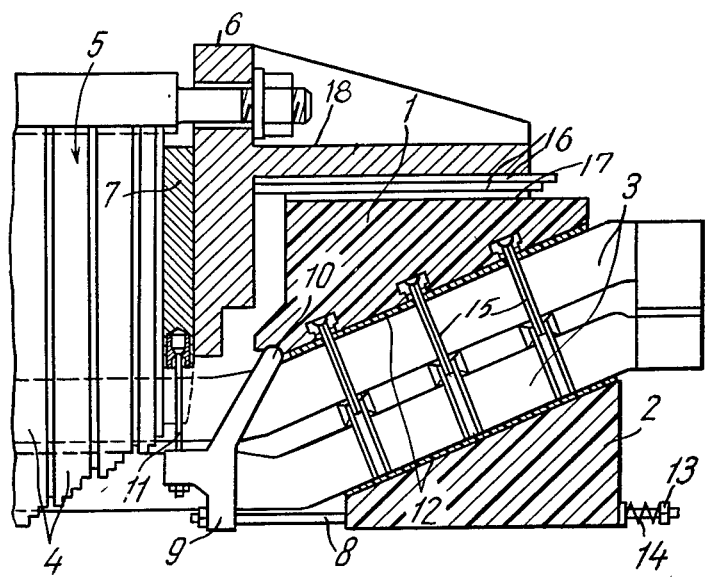

Referring now to FIG. 1, the device for securing end connectors of the stator winding of an electric machine comprises two conical rings 1, 2 (FIG. 1) made of an insulating material, e.g., fiber glass or wood laminates. End connectors 3 of a winding 4 of the stator rest on the inner conical surface of the outer insulating ring 1 and are pressed thereto by means of the inner insulating ring 2. The rods of the winding 4 are placed into grooves of a core 5 made up of magnetic circuit stacks. Elements clamping the magnetic circuit stacks axially and comprising a clamp board 6 and thrust pins 7 connected therewith are placed on the side of both end surfaces of the core 5.

A cord binding 15 is used to fix the end connectors 3 of the winding relative to the outer conical ring 1 during the assembly of the electrical machine.

The outer cylindrical surface of the conical ring 1 is supported by a cylindrical projection 18 of the clamping board 6 of the core 5. During the assembly of the machine, oppositely directed wedges 16 and a spacer 17, made of an insulating material, are inserted into the space between the ring 1 and the projection 18. In such manner, the ring 1 and, consequently, the end connectors 3 of the winding 4 are rigidly connected in the radial direction to the clamping board 6 of the core 5. The spacer 17 and the oppositely directed wedges 16 are held against the projection 18 of the clamping board 6, to prevent them from radially displacing during operation of the electrical machine, by means of an adhesive, pins or other appropriate means (not shown in the drawings).

The outer insulating ring 1 is thus tightly secured to the clamp board 6 so that axial movement thereof is provided with respect to the core 5 in the case of thermal strain of the winding 4 and the core 5. The outer conical surface of the inner insulating ring 2 rests on the end connectors 3 of the winding 4 from the boring side and is retained by means of axial rods 8 arranged in the holes of the inner ring 2. Alternatively, the axial rods 8 may be arranged on the inner cylindrical surface of the ring 2. The axial rods 8 are made of a non-magnetic metal or of an insulating material. One end of the axial rods 8 is attached to the outer end surface of the inner conical ring 2, the outer end being hinged to supports 9 made of an insulating material and arranged between the rods of the winding 4 in the area of their exit from the grooves of the core 5.

The supports 9 pivotally rest in a circular notch 10 on the end surface of the outer conical ring 1 facing the core 5. They are retained by means of radially arranged rods 11 made of non-magnetic steel and radially disposed in the area of the end portion of the core 5. One end of each radially arranged rod 11 is pivotally attached to the support 9, the other end being attached to the thrust pin 7. Holders are made up of the radially arranged rods 11 and the supports 9, said holders being capable of withstanding an axial load.

Elastic layers 12 made of a castable material are placed between the conical surfaces of the insulating rings 1 and 2 and the end connectors 3 of the winding 4 for uniform distribution of the thrusting force of the rings 1 and 2 to the end connectors 3.

Springs 14 providing a permanent thrusting force of the inner ring 2 are placed under a nut 13 of the axially arranged rods 8 on portions of the rods extending beyond the outer end surface of the inner ring 2 to compensate for the inevitable displacement of the inner conical ring 2 in operation. This displacement is generally caused by shrinkage, thermal strain, and consolidation of the end connectors 3 of the winding 4.

Figure 2:
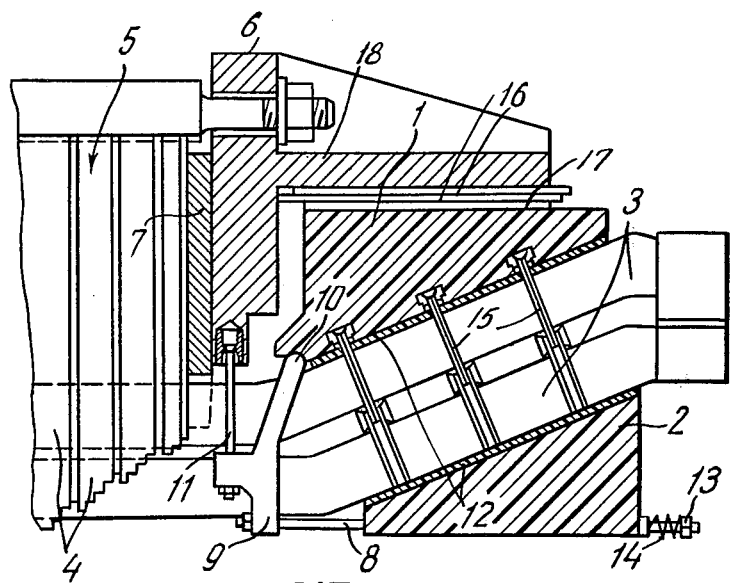

FIG. 2 shows a device for securing end-connectors of the stator winding of an electric machine, wherein the radially arranged rods 11 are secured in the clamp board 6 of the core 5.

During operation of the turbogenerator, the end connectors 3 of the winding 4 which are rigidly tightened between the two conical rings 1 and 2 and which rest on the clamp board 6 of the core 5 via the outer ring 1, are unable to deform or be displaced with respect to each other under the effect of variable electrodynamic loads.

The force with which the conical ring 2 is urged against the connectors 3 of the winding 4 is transferred to the outer conical ring 1 by the following components: the inner ring 2, the axially arranged rod 8, the support 9, the outer ring 1, the end connectors 3 and the inner ring 2. The radial force in the support 9 is compensated for by the radial forces in the pendulumtype radially arranged rod 11 which does not prevent the end connectors 3 of the winding 4 from joint axial movement with the outer conical ring 2 with respect to the clamp board 6 of the core 5.

The springs 14 permit adjustment of the force pressing the end connectors 3 of the winding 4 between the insulating conical rings 1 and 2.

The device for securing end connectors of the stator winding of an electric machine, as hereinbefore disclosed, is dependable and technologically efficient.

Many other modifications and embodiments may be possible to carry into effect the proposed device for securing end connectors of electric machine stator winding, said modifications and embodiments keeping in step with the scope and subject matter of the invention.

While particular embodiments of the invention have been shown and described, various modiciations thereof will be apparent to those skilled in the art and therefore it is not intended that the invention be limited to the disclosed embodiments or to the details thereof and departures may be made therefrom within the spirit and scope of the invention as defined in the claims.

What is claimed is:

1. In a stator of an electric machine having a winding having end connectors, a core made up of magnetic circuit stacks and having grooves wherein said winding is placed, means for axial clamping of said magnetic circuit stacks mounted on the end surface of said core and including clamp boards and thrust pins, a device for securing said end connectors of said winding comprising:

an outer ring and an inner conical ring each made of an insulating material, said end connectors of said winding being arranged between said rings, said outer ring being connected with said clamp board to move axially with respect to said clamp board for securing said end connectors;

a plurality of rods axially arranged and mounted on said inner conical ring for axial clamping of said inner conical ring;

a plurality of supports, for attachment of said inner conical ring to said outer conical ring, arranged at the exit of said winding from said grooves, a first end of each support being pivotally connected with said axially arranged rod, a second end of each support pivotally resting on an end surface of said outer conical ring facing said core; and a plurality of rods radially arranged at an end portion of said core, a first end of each rod being pivotally connected with said means for axially clamping, a second end of said rod being connected with said supports, said radially arranged rods and said supports being capable of withstanding axial loads.

2. A device for securing the end connectors of an electric machine stator winding as claimed in claim 1, wherein said first end of each of said radially arranged rods is pivotally connected with said thrust pin and said second end is connected with said support.

3. A device for securing the end connectors of an electric machine stator winding as claimed in claim 1, wherein said first end of each of said radially arranged rods is pivotally connected with said clamp board and said second end is connected with said support.

4. A device for securing the end connectors of an electric machine stator winding as claimed in claim 1, wherein said axially arranged rods have springs mounted on an end extending beyond on the side of the outer end surface of said inner conical ring to provide firm clamping of said inner conical ring to said end connectors of said winding.

5. A device for securing the end connectors of an electric machine stator winding as claimed in claim 2, wherein said axially arranged rods have springs mounted on an end extending beyond the side of the outer end surface of said inner conical ring to provide for firm clamping of said inner conical ring to said end connectors of said winding.

6. A device for securing the end connectors of an electric machine stator winding as claimed in claim 3, wherein said axially arranged rods have springs mounted on an end extending beyond on the side of the outer end surface of said inner conical ring to provide firm clamping of said inner conical ring to said end connectors of said winding.

* * * * *